W. W. NEAL.
Fruit Gatherer.
No. 77,400. Patented April 28, 1868.
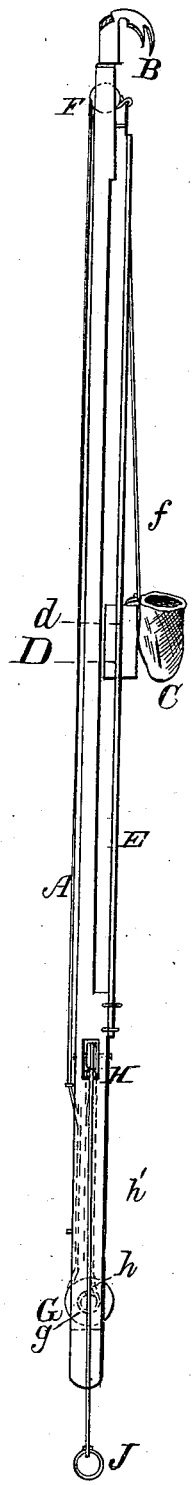

United States Patent Office.

H. WALKER NEAL, OF SIDNEY, OHIO.

*Letters Patent No. 77,400, dated April 28, 1868.*

IMPROVEMENT IN FRUIT-GATHERERS.

*The Schedule referred to in these Letters Patent and making part of the same.*

TO ALL WHOM IT MAY CONCERN:

Be it known that I, H. WALKER NEAL, of Sidney, in the county of Shelby, and State of Ohio, have invented certain new and useful Improvements in Fruit-Gatherers; and I do hereby declare that the following is a full, clear, and exact description thereof, reference being had to the accompanying drawing, and to the letters of reference marked thereon, which form a part of this specification, and which represent my improved fruit-gatherer.

The object of my invention is to provide a cheap and simple contrivance, whereby apples or other fruit may be rapidly and safely picked from any part of the tree, without any risk of bruising the fruit, and the necessity of climbing be obviated; and to this end my improvement consists in providing a rod or staff furnished with a picking-hook and basket to gather and retain the fruit, and with a slide and pulleys to operate the same, arranged as hereinafter described, so as to enable a person standing upon the ground to collect the fruit with safety and dispatch.

In the accompanying drawing, A represents the rod of the fruit-gatherer, which may be made of any suitable timber, pine, for example, and usually about twenty-five feet in length. It is made of sufficient diameter to secure the necessary stiffness, and tapering towards its upper extremity, which has upon it a hook, B, to pick the fruit. This hook should be lined with kid, or some other soft material, to prevent bruising the fruit, and is provided with fingers to catch the same. A basket or pouch, C, of size large enough to contain about ten apples, is attached to a slide, D, which moves up and down upon the guide E fastened to the rod A, and passing through a slot, $d$, in the slide. A cord, $f$, attached to this slide, passes over the small pulley F, near the top of the rod, and then downwards to the larger pulley G, near the lower end thereof, to which it is fastened. The pulley G has upon its shaft a small pulley, $g$, shown in dotted lines. A cord, $h$, fastened to the pulley $g$, passes upwards in the groove $h'$ of the rod, and over another pulley, H. It is provided at its extremity with a ring, J, of suitable size to be caught by the thumb of the operator.

The operation of the fruit-gatherer is as follows: The rod is held firmly near its lower end by the right hand, and guided by the left until the hook is brought into proper position to pick the fruit. The thumb of the left hand being then applied to the ring J of the cord $h$, the latter is drawn downwards, and by its attachment to the pulley $g$, causes the cord $f$ to be wound upon the pulley G, and draws up the basket until it comes sufficiently close to the hook, when a slight movement of the rod detaches the fruit, which drops into the basket. The weight of the slide to which the basket is attached draws the latter down when the ring J is released from the thumb.

Having thus fully described my invention, what I claim therein as new, and desire to secure by Letters Patent, is—

1. The slide D attached to the basket of the fruit-gatherer, and working up and down upon the guide E.
2. The combination of the cord $h$ and multiplying-pulley G, for the purpose of rapidly elevating the basket.
3. The combination of the cords $f$ and $h$, basket C, and hook B, arranged and operating as described, for the purpose set forth.

In testimony that I claim the foregoing as my own, I affix my signature in presence of two witnesses.

H. WALKER NEAL.

Witnesses:
T. F. WILKINSON,
H. C. ROBERTS.